United States Patent [19]

Baumgartner et al.

[11] Patent Number: 4,576,971
[45] Date of Patent: Mar. 18, 1986

[54] FLAME-RETARDED POLYACRYLAMIDE OR POLYMETHACRYLIMIDE SYNTHETIC RESIN FOAM

[75] Inventors: Ehrenfried Baumgartner, Darmstadt; Siegmund Besecke, Seeheim-Jugenheim; Wolfgang Gaenzler, Darmstadt-Arheilgen, all of Fed. Rep. of Germany

[73] Assignee: Röhm GmbH, Darmstadt, Fed. Rep. of Germany

[21] Appl. No.: 683,042

[22] Filed: Dec. 18, 1984

[30] Foreign Application Priority Data

Dec. 21, 1983 [DE] Fed. Rep. of Germany ....... 3346060

[51] Int. Cl.⁴ ............................................. C08J 9/06
[52] U.S. Cl. .................................... 521/108; 521/85; 521/94; 521/128; 521/149; 524/130
[58] Field of Search ................... 521/149, 108, 85, 94, 521/128; 524/130

[56] References Cited

U.S. PATENT DOCUMENTS 2,773,046 12/1956 Dunn et al. ......................... 260/30.6
3,627,711 12/1971 Schroeder et al. .............. 260/2.5 N
4,187,353 2/1980 Schroeder et al. ................. 521/149
4,205,111 5/1980 Pip et al. .............................. 428/215

FOREIGN PATENT DOCUMENTS 1817156 9/1975 Fed. Rep. of Germany .
2047096 11/1976 Fed. Rep. of Germany .
2822884 11/1979 Fed. Rep. of Germany .
2822885 11/1979 Fed. Rep. of Germany .
2726260 5/1983 Fed. Rep. of Germany .
1346676 2/1974 United Kingdom .

OTHER PUBLICATIONS

Kirk-Othmer, Encyclopedia of Chemical Technology, 3rd Ed., vol. 10, John Wiley & Sons, New York, pp. 396–410.

Primary Examiner—Morton Foelak
Attorney, Agent, or Firm—Curtis, Morris & Safford

[57] ABSTRACT

Flame retarded polyacrylimide or polymethacrylimide resin foams containing at least 70 percent by weight of cyclic acrylimide or methacrylimide units and incorporating at least 1 percent by weight of phosphorus, present at least partially in the form of a phosphorus compound, $XCH_2-PO(OR)_2$, wherein R is methyl, ethyl, or chloromethyl, and X is hydrogen, halogen, hydroxyl, or RO—CO—.

11 Claims, 1 Drawing Figure

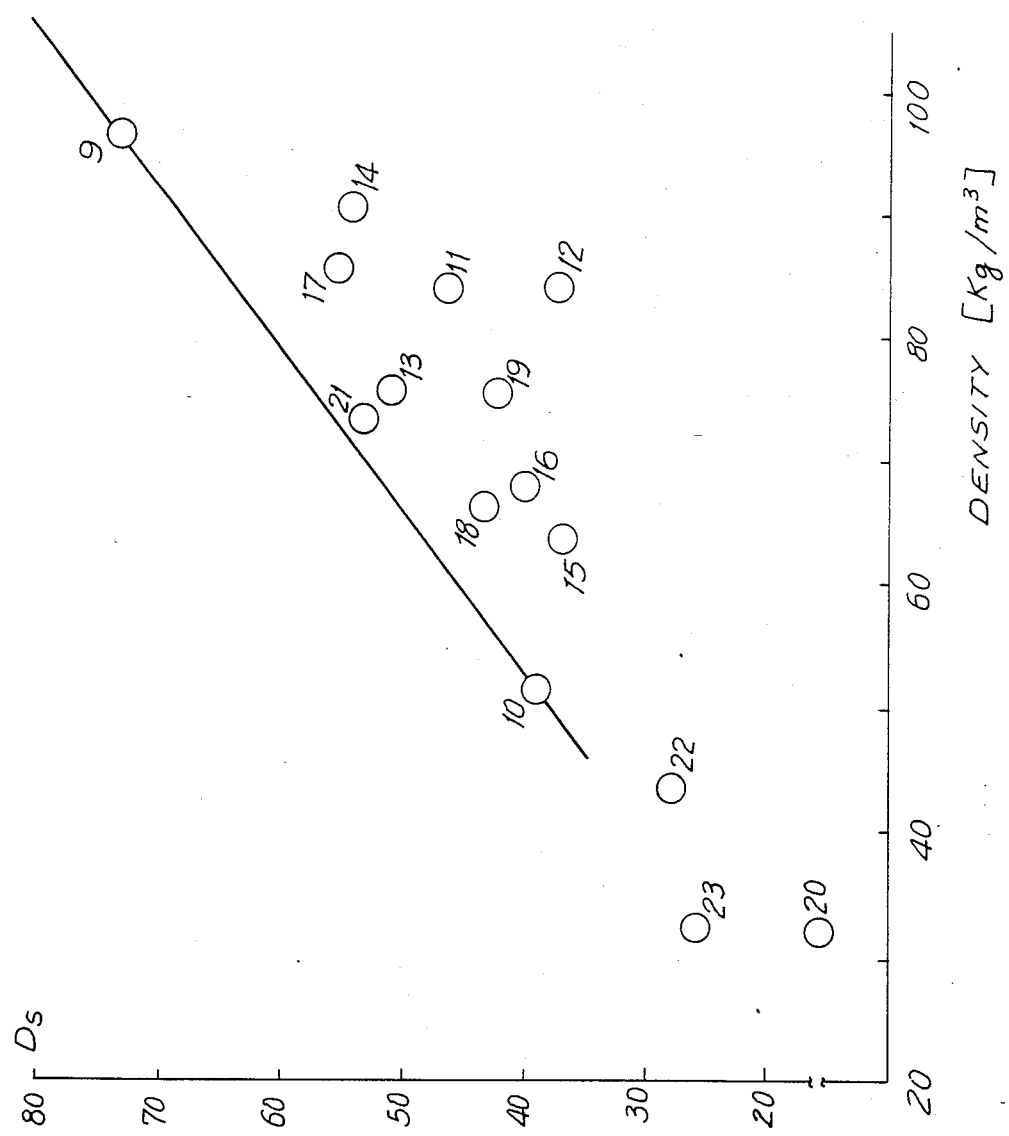

FLAME-RETARDED POLYACRYLAMIDE OR POLYMETHACRYLIMIDE SYNTHETIC RESIN FOAM

The present invention relates to a flame retarded polyacrylimide or polymethacrylimide synthetic resin foam comprising a polymer with repeating units of the structure.

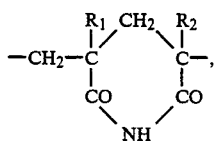

wherein $R_1$ and $R_2$ are each hydrogen or methyl, or of a copolymer of at least 70 weight percent of units with the above structure and up to 30 weight percent of units of one or more other ethylenically unsaturated comonomers, and at least 1 weight percent of phosphorus, present at least partially in the form of an organophosphorus compound.

Polyacrylimide or polymethacrylimide resin foams are distinguished by a high heat distortion point and by high pressure resistance. They are extremely well suited for the production of bodies capable of bearing high loads by combining them with fiber reinforced top layers.

German Pat. No. 2047096 teaches a flame retarded polymethacrylimide resin foam produced by heating a copolymer of methacrylonitrile, methacrylic acid, methyl methacrylate, and maleic anhydride containing formic acid as a blowing agent and phosphoric acid and dibromopropyl phosphate as flame retardant additives. When heated to 150° C. to 250° C., the methacrylonitrile and methacrylic acid units cyclize to methacrylimide units with the structure given above ($R_1=R_2=CH_3$). The phosphorus content of the foamed resin ranges from 1.5 to 3 weight percent.

Foamed resins produced in accordance with the publication cited have appeared on the marked under the trade name "ROHACELL S".

The object of the present invention is to facilitate the production of flame retarded polyacrylimide and polymethacrylimide foamed resins and to reduce the water absorption of such foamed resins without, however, decreasing their thermal and mechanical properties in comparison with polyacrylimide and polymethacrylimide foamed resins which do not incorporate flame retardants.

It has been found that flame retarded polyacrylimide and polymethacrylimide foamed resins having the composition given above meet these requirements if they contain an organophosphorus compound having the structure.

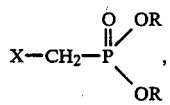

wherein R are the same or different and are methyl, ethyl, or chloromethyl, and X is hydrogen, halogen, hydroxyl, or RD—CO—.

The prior art flame retarded polymethacrylimide foamed resins contain free phosphoric acid as the principal constituent of the flame retarded additives. Therefore they are very hydrophilic and are able to absorb large amounts of water, as a result of which their technological properties are significantly degraded. Mechanical properties, such as the resistance to pressure at elevated temperatures, are severly impaired. Organic phosphonic acids and other strong polar organophosphorus compounds have a similar effect. Even nonpolar phosphorus compounds such as phospholane (2-methyl-2,5-dioxo-1-oxa-2-phospholane) result in the same disadvantages.

A further drawback of most of the flame retardant additives used up to now manifests itself in the production of foamable prepolymers by the polymerization of vinyl monomers in a hollow mold that is immersed in a water bath. Namely, there is a reduction in adhesion between the still unfoamed intermediate product being polymerized and the glass or metal mold walls between which such prepolymeric intermediate products usually are produced. In the course of its production, the intermediate product separates from the mold walls, which gives rise to still other difficulties. For reasons which are not clear, the polymer becomes inhomogeneous over the areas where it separates, recognizable as white areas which on heating will foam incompletely or not at all. Inhomogeneities having the same consequences occur also at points where water penetrates into the crack formed by the separation of the polymer. Even a single area of separation, or just a few such areas, can render a whole polymer batch unfit for use because an inhomogeneous foamable intermediate product will not yield a uniformly foamed end product.

From this it had to be concluded that phosphorus compounds basically increase water absorption and also have a plasticizing effect. In addition, most of them appear to given rise to polymerization problems of the kind mentioned. Even moderately hydrophobic phosphorus compounds with fairly large aliphatic or aromatic groups could not have been expected to yield a better combination of properties, since, because of their lower phosphorus content, such compounds would have to be used in appropriately larger amounts, their known plasticizing action thus being enhanced.

Like phospholane, many other organophosphorus compounds, which i other cases are effective flame retardant additives, proved unusable for a variety of reasons, for example insufficient solubility, interference with polymeriaztion or with foaming, or inadequate flame retardancy. This was true of triphenylphosphine, triphenylphosphine oxide, triphenyl phosphate and triphenyl phosphite, benzenephosphonic acid, and propanephosphonic acid, for example.

Thus, it was all the more surprising that phosphonate esters having the formula

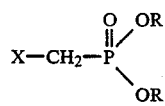

will not result in the disadvantages mentioned above even though they are water soluble and it seemed likely that they would have a pronounced hydrophilizing effect. On the other hand, they have outstanding flame retardant properties.

The combination advantageous effects of the phosphonate esters mentioned are apparent from the following Table which compares the properties of the new foamed resins with foamed resins which either (a) incorporate no flame retardant additives, (b) contain strongly polar phosphorus compounds according to Example 8 of German Pat. No. 20 47 096, or (c) contain nonpolar organophosphorus compounds. All foamed resins under comparison had densities ranging from 50 to 60 kg/m³ and a comparable base polymer composition.

manufacture of vehicles and aircraft, in shipbuilding, and in space technology.

Polyacrylimide and polymethacrylimide foamed resins are produced by heating a usually slablike foamable intermediate product over several hours to a temperature from 150° C. to 250° C. Foamed resins having a bulk density between 20 and 500 kg/m³ are so obtained.

TABLE

| Type of foamed plastic | Flame retardant Type | Amount (wt. %) | FAR test 25.853a for flame resistance | Pressure resistance at 180° C. (N/mm²) | Water absorption after 50 days (vol. %) |
|---|---|---|---|---|---|
| Foamed plastics in accordance with the invention, produced from a copolymer of methacrylic acid and methacrylonitrile (56:44 pts. by wgt.) with 0.5 wt. % magnesium methacrylate, alcohols as blowing agents | Dimethyl-methane phosphonate | 10 | Passed | 0.38 | 21.2 |
|  | Alkoxy-carbonyl methane-phosphonate diethyl ester | 15 | Passed | 0.26 | 21.9 |
| (a) Foamed plastic according to German patent 27 26 260, composition of polymer as above | None |  | Failed | 0.38 | 17 |
| (b) Foamed plastic according to German patent 20 47 098, example 8 | Phosphoric acid | 10 | Passed | 0.10 | 45 |
|  | Tris(dibromopropyl) phosphate | 5 |  |  |  |
| (c) Foamed plastic in accordance with the invention but a different flame retardant | Phospholane | 10 | Failed | 0.10 | 56 |

Another surprising advantage of the phosphonate esters used according to the invention is that they eliminate the problems arising from insufficient adhesion of the intermediate product to the walls of the polymerization mold. The intermediate product can be made to be as homogeneous as when no flame retardants are present.

In accordance with German Pat. No. 27 26 260 (=U.S. Pat. No. 4,187,353), the addition of a metal salt such as magnesium methacrylate, which usually serves to regulate the foam density, here has the further surprising advantage of reducing smoke generation when the foamed resins of the invention are exposed to fire. This is true particularly of amounts of metal in excess of 1 percent by weight of the monomer mixture. Preferably at least 2 weight percent is used, and in actual practice from 2 to 5 weight percent. Surprisingly, maleic and itaconic acid and their anhydrides have a similar effect on smoke generation as do metal salts.

Because of their advantageous combination of properties, the new foamed resins are especially well suited for the production of laminates which have a foamed resin core and a layer of metal or of a thermoplastic or thermosetting resin, optionally reinforced with fibers, laminated onto it on one or both sides. A preferred method for the production of such laminates is the so-called prepreg technique. (See U.S. Pat. No. 4,205,111 incorporated herein by reference). Laminates are used in the construction of light weight structures which must meet stringent fire safety requirements, as in the All additives necessary for the properties which the foamed resin is to possess are already incorporated in the slablike intermediate product, usually by adding them to a mixture of acrylic or methacrylic monomers and blowing agents from which the intermediate product is obtained by free radical polymerization.

The characteristic repeating units of the polymers or copolymers from which the resin matrix of the foam is formed have the structure of a cyclic imide,

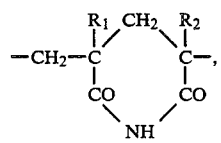

wherein $R_1$ and $R_2$ are each hydrogen or methyl. When the polymer is based on acrylic monomers, $R_1$ and $R_2$ are hydrogen. Preferably, however, methacrylic monomers are used which will yield methacrylimide units wherein $R_1$ and $R_2$ are both methyl. Mixed imide units wherein $R_1$ is hydrogen and $R_2$ is methyl or $R_1$ is methyl and $R_2$ is hydrogen are formed when acrylic and methacrylic monomers are used concurrently.

The various reactions, analogous to polymerization, which can result in the formation of such imide units have been described in detail in German Pat. No. 18 17 156 (=U.S. Pat. No. 3,627,711 incorporated herein by reference). Of these, intramolecular cyclization of copolymers of acrylic or methacrylic acid and acrylonitrile or methacrylonitrile is of major commercial importance. What follows therefore relates primarily to the production of foamed resins from such monomer mixtures, but is applicable also to other monomer mixtures which result in imidizable intermediate products. These mixtures may contain acrylamide or methacrylamide units, for example, in place of acrylonitrile or methacrylonitrile units. The foamed plastics are preferably based on monomer mixtures which contain at least 20 weight percent (based on the total weight of the monomers) of acrylic and/or methacrylic acid, together with one or more other unsaturated monomers. Particularly preferred monomer mixtures comprise acrylic acid and/or methcrylic acid and acrylonitrile and/or methacrylonitrile in a mol ratio ranging from 2:3 to 3:2.

Since the conversion of the polymerized monomers to acrylimide or methacrylimide groups does not always run to completion during the heating of the intermediate product and during foaming, the polymers or copolymers of which the foamed resin is composed frequently contain small amounts of the original monomer units. Other nonimidic units may stem from further comonomers used concurrently whose polymerizable units cannot be transformed to cyclic imide groups, or are transformed only with difficulty. Illustrative of these are the esters of acrylic acid or methacrylic acid, especially with lower ($C_1-C_4$) alcohols, styrene, maleic acid or its anhydride, itaconic acid or its anhydride, vinylpyrrolidone, vinyl chloride, vinylidene chloride, etc. The nonimidic comonomer units should not amount to more than 30, and preferably not to more than 10, weight percent.

For foaming of the intermediate product during its conversion to a polymer containing imide groups, blowing agents are used which form a gaseous phase by decomposition or vaporization at a temperature from 150° C. to 250° C. Blowing agents having an amide structure, such as urea, monomethyl urea or N,N'-dimethylurea, formamide, or monomethyl formamide, on decomposition liberate ammonia or amines which are able to react with the polymer with formation of imide groups. The monomer mixture therefore need not in every case be of such composition that it is completely convertible to polyacrylimide or polymethacrylimide; rather, a stoichiometric excess of acrylic acid or of methacrylic acid may be present. Even homopolymers of acrylic or methacrylic acid can be converted completely to polyacrylimide or polymethacrylimide by the use of a sufficient amount of such blowing agents having an amide structure. When the blowing agent need not participate in imide formation, nitrogen free blowing agents such as formic acid, water, or monhydric aliphatic alcohols having from 3 to 8 carbon atoms, such as 1-propanol, 2-propanol, 1-butanol, tert-butanol, 2-butanol, isobutanol, pentanols, hexanols, etc., may be used. The amount of blowing agent to be used depends on the density which the foamed plastic is to have and generally ranges from 2 to 15 parts by weight per 100 parts by weight of the monomers. The acrylates or methacrylates of alkali metals or of alkaline earth metals, or of zinc, zirconium, or lead, or other compounds of these metals which are soluble in the monomer mixture, may be added to the latter as metal salts which also have a smoke reducing effect. Sodium, potassium, tin, manganese, and calcium acrylate and methacrylate are preferred. Amounts from 2 to 5 parts by weight per 100 parts by weight of the monomers will result in a significant reduction of the smoke density in the flame resistance test in conformity with U.S. Federal Aviation Regulations 25.853a. According to this test, a foam sample $1 \times 1 \times 12$ inches is vertically suspended and exposed to a Bunsen burner flame 1½ inches high for 1 minute. The test is passed: (1) if the sample burns for no longer than 15 seconds after the flame is removed; (2) no burning drops fall from the sample; and (3) no more than 6 inches (150 mm) of the sample are consumed by flame. For testing smoke production as a further part of the test, a chamber according to ASTM-E 662 is used. A foam sample $3 \times 3 \times 0.5$ inches is irradiated with heat for 1.5 minutes at an energy density of 2.5 watt/cm² and then ignited with a flame within the next 1.5 minutes. The decrease in intensity (Ds) of a beam of light within the chamber is then measured. The value must be below 100.

The monomer mixture should further contain an initiator yielding free radicals, such as dibenzoyl peroxide or azobisisobutyronitrile, and is preferably polymerized at temperatures ranging from 35° C. to 120° C. It is advisable to carry out the polymerization to form intermediate polymer slabs from 1 to 3 cm thick, which can then be expanded at a temperature from 150° C. to 250° C. to correspondingly larger foamed plastic slabs.

The total phosphorus content of the foamed resin is of decisive importance to its flame retardant properties. The content should be at least 1 weight percent, based on the total weight of the foamed plastic, and preferably ranges from 1.5 to 5 weight percent.

When the polymer is exposed to flames, a layer (presumably of phosphorus oxides) is produced on its surface and hinders further contact with air, thus inhibiting combustion. Since all phosphorus compounds are converted to the same phosphorus oxides by the action of flames, the chemical nature of the phosphorus incorporated is of less importance so far as flame resistance is concerned than is the total phosphorus content. The choice of the phosphorus containing flame retardant therefore can be based primarily on its effect on the ease of production and the properties of the foamed plastic.

The phosphonate esters which are used as flame retardants in accordance with the invention may be used together with other flame retardants provided that the latter do not have an adverse effect on the properties of the foamed resin. For example, they may be used along with red phosphorus, which can be uniformly dispersed in the liquid monomer mixture by the addition of highly disperse silicic acid. Although it has neither hydrophilizing nor plasticizing action, red phosphorus has proved less useful as the sole flame retardant in polyacrylimide or polymethacrylimide foamed resins than are organophosphorus compounds which are soluble in the monomer mixture. However, red phosphorus may be used in combination with the latter. Since most inorganic or organic phosphorus compounds have either hydrophilizing or plasticizing action, they can only be used in very small amounts, which in themselves are insufficient to impart flame retardancy, together with the claimed phosphonate esters. The latter will usually represent at least one-half, and preferably from 70 to 100 percent, of the total weight of phosphorus contained in the foamed plastic.

The characteristic property of the phosphonate esters used in accordance with the invention is their surprisingly small effect on the resistance of the resin matrix to compression, especially at high temperatures. One possible explanation for this behavior might be that while these esters are compatible with the polymer of the intermediate product, they are not compatible with the imidized polymer and are exuded into the pores of the foamed resin. This incompatibility could be due to the absence of fairly long aliphatic groups or to the relatively strong polar organic groups of the phosphonic acid portion. However, it is not intended that the present invention be tied to this interpretation.

The methyl, chloromethyl, or ethyl esters of methane-, chloromethane- or hydroxymethane-phosphonic acid or of methoxy-, ethoxy- or chloromethoxycarbonyl methanephosphonic acid are suitable for use as flame retardants of the formula $XCH_2-PO(OR)_2$. The methyl esters of methanephosphonic acid and of methoxycarbonyl or ethoxycarbonyl methanephosphonic acid have the least plasticizing action and these esters are therefore preferred.

While halogen atoms will enhance flame retardancy, in case of fire they can form toxic and severly corrosive gases which in the event of a catastrophe will pose a further hazard. For this reason, halogen free retardants are preferred in the foamed resin in accordance with the invention. Despite their technologically favorable effect, chloromethyl esters and the esters of chloromethyl-phosphonic acid therefore are not contained in the preferred foamed resins of the invention.

The flame retardants are incorporated in the liquid monomer mixture much like the other additives. The phosphonate esters in accordance with the invention are soluble in the monomer mixtures which are appropriate and will not interfere with polymerization. It is believed that they remain unchanged during the polymerization.

A better understanding of the present invention and of its many advantages will be had from the following specific examples, given by way of illustration.

EXAMPLE 1 to 5

3 parts by weight (pbw) of isopropanol and 1 pbw of tert-butanol as blowing agents and 0.05 pbw of tert-butyl perpivalate and 0.1 pbw of dibenzoyl peroxide as initiators were added to a mixture of equal molar parts of methacrylic acid and methacrylonitrile (56.2:43.8 parts by weight). Various flame retardants were added in amounts of 10 or 15 pbw and magnesium dimethacrylate in an amount of 0.5 pbw. (See Table 1.)

These mixtures were polymerized at 40° C. in a chamber formed by two glass plates measuring 50×50 cm and an edge seal 2.2 cm thick and after tempering at 100° C., were foamed for 3 hours at the temperature indicated.

EXAMPLES 6 to 8

Under the conditions given in Example 1, mixtures were polymerized which differed from the mixture of Example 1 in the following respects:

Example 6: Plus 1 pbw zinc dimethacrylate
Example 7: Plus 1 pbw maleic acid
Example 8: 4 pbw urea, 2 pbw isopropanol, and 0.25 pbw alkyl methacrylate in place of the tert-butanol/isopropanol mixture.

The foamed resins obtained had the following bulk densities: Example 6, 58 kg/m$^3$; Example 7, 50 kg/m$^3$; Example 8, 52 kg/m$^3$.

The results of the Examples are shown in following Tables 1–4.

TABLE 1

Composition of polymerization mixtures

| Example | Flame retardant $XCH_2PO(OR)_2$ X | R | Amount (pbw) | Methacrylic acid (Pbw) | Methacrylonitrile (pbw) | Isopropanol (pbw) | tert-Butanol (pbw) | Magnesium dimethacrylate (pbw) |
|---|---|---|---|---|---|---|---|---|
| 1 | H | CH$_3$ | 10 | 56.2 | 43.8 | 3 | 1 | 0.5 |
| 2 | —CO—O—C$_2$H$_5$ | C$_2$H$_5$ | 15 | 56.2 | 43.8 | 3 | 1 | 0.5 |

| Comparative examples | Other flame retardant Name | Amount (pbw) | | | | | | |
|---|---|---|---|---|---|---|---|---|
| 3 | Phospholane | 10 | 56.2 | 43.8 | 3 | 1 | 0.5 |
| 4 | None | — | 56.2 | 43.8 | 3 | 1 | 0.5 |
| 5 | None | — | 70 | 30 | 8.2** | — | — |

**Formamide

TABLE 2

| | Foaming conditions | | |
|---|---|---|---|
| Example | Foaming temperature (°C.) | Foaming time (hours) | Foam density (kg/m$^3$) |
| 1 | 200 | 3 | 50–60 |
| 2 | 200 | 3 | 50–60 |
| 3 | 200 | 3 | 50–60 |
| 4 | 220 | 3 | 50–60 |
| 5 | 190 | 3 | 50–60 |

TABLE 3

| | Properties | | | |
|---|---|---|---|---|
| | Pressure resistance | | Heat | Water absorption after 7 days |
| Example | at 23° C. (N/mm$^2$) | at 180° C. (N/mm$^2$) | distortion point (°C.) | under water (wt. %) |
| 1 | 1.07 | 0.38 | 200 | 93.4 |
| 2 | 0.78 | 0.26 | 187 | 108 |
| 3 | 0.55 | <0.05 | 185 | 498 |
| 4 | 0.82 | 0.38 | 205 | 100 |
| 5 | 0.8 | <0.05 | 175–180 | 80–120 |

TABLE 4

Flame-resistant properties of foamed plastics according to Example 1 to 8

| Example | FAR test 25.853a (maximum length of burned portion <150 mm) | Smoke-density test ($D_s$ after 4 minutes <200) | |
|---|---|---|---|
| | | Without exposure to flame | With exposure to flame |
| 1 | 116 mm - passed | 114 - passed | 222 - failed |
| 2 | 104 mm - passed | 69 - passed | 139 - passed |
| 3 (comparison) | 152 mm - failed | (66) | (209) |
| 4 (comparison) | burned | | |
| 5 (comparison) | burned | | |
| 6 | | 81 - passed | 190 - passed |
| 7 | | 95 - passed | 172 - passed |
| 8 | 101 - passed | 127 - passed | 185 - passed |

EXAMPLES 9 to 25

These examples illustrate the reduction in smoke density, $D_s$, on exposure to a flame in keeping with FAR test 25,853a as a function of bulk density. With foamed resins of the same composition, smoke density increases in proportion to bulk density. In the case of foamed resins incorporating smoke reducing additives, a foamed resin with the same bulk density and without such an additive but of otherwise identical composition must therefore be used for reference. From the graph, in which smoke density $D_s$ is plotted against bulk density, an improvement in smoke density is apparent in the case of all Examples whose smoke density value is below the straight line established by the resin of additive free Examples 9 and 10.

The standard foamed resins (Examples 9 and 10) were produced by the polymerization of a mixture of:
56.2 pbw of methacrylic acid,
43.8 pbw of methacrylonitrile,
0.5 pbw of magnesium dimethacrylate,
0.2 pbw of allyl methacrylate,
3.0 pbw of tert-butanol,
1.0 pbw of isopropanol,
0.2 pbw of tert-butyl perpivalate,
0.05 pbw of dibenzoyl peroxide, and
10 pbw of dimethyl methanephosphonate.

For polymerization, the mixtures were heated in sealed glass ampules for 20 hours at 50° C., for 3 hours at 60° C. to 100° C., and for 3 hours at 100° C. Two samples of the polymer were heated for 2 hours at 210° C. and 225° C., respectively, which resulted in foamed resin with bulk densities of 97 and 52 kg/m³, respectively.

The same procedure was followed in Examples 11 to 25, except that smoke reducing additives according to following Table 5 were concurrently used. The foaming temperatures ranged in all cases from 200° C. to 230° C. Bulk density and smoke density, determined by the methods specified in FAR test 25.853a, are also given in Table 5. These values are plotted in the graph. ("MAA" stands for the anion of methacrylic acid, "acac" for the anion of the acetylacetonate.)

TABLE 5

| Example | Smoke-reducing additive Type | Amt (pbw) | Bulk density (kg/m³) | Smoke density* ($D_s$) |
|---|---|---|---|---|
| 9 | None | — | 97 | 73 |
| 10 | None | — | 52 | 39 |
| 11 | Sodium MAA | 2 | 84 | 46 |
| 12 | Sodium MAA | 5 | 85 | 37 |
| 13 | Magnesium MAA | 2 | 76 | 51 |
| 14 | Calcium (MAA)₂ | 2 | 91 | 54 |
| 15 | Calcium (MAA)₂ | 5 | 64 | 37 |
| 16 | Zinc (MAA)₂ | 2 | 68 | 40 |
| 17 | Zinc (acac)₂ | 2 | 86 | 55 |
| 18 | Zinc (acac)₂ | 5 | 67 | 43 |
| 19 | Zinc acetate | 2 | 76 | 42 |
| 20 | Zinc nitrate | 2 | 33 | 14 |
| 21 | Lead tetraphenyl | 1 | 73 | 54 |
| 22 | Maleic acid | 5 | 44 | 28 |
| 23 | Itaconic anhydride | 5 | 32 | 26 |
| 24 | Potassium MAA | 5 | 84 | 42 |
| 25 | Zirconium (MAA)₄ | 2 | 56 | 39 |

*Measure 4 minutes after exposure to flame.

EXAMPLES 26-29

Additional flame retardants according to the invention and one related material not within the invention (Example 29) were tested in a foam composition like that of Examples 1–5 comprising isopropanol and tert-butanol as blowing agents, equimolar parts of methacrylic acid and methacrylonitrile, and magnesium dimethacrylate in an amount of 0.5 pbw. Polymerization was as earlier described, followed by foaming for 3 hours at 200° C. The composition and heat resistance of the foams is summarized in Table 6.

TABLE 6

| Example | Flame retardant $XCH_2PO(OR)_2$ X | R | Amt. (pbw) | Density (kg/m³) | FAR test 28.853a (maximum length of burned portion) |
|---|---|---|---|---|---|
| 26 | Cl | $CH_3$ | 15 | 26 | 110 mm - passed |
| 27 | HO | $CH_3$ | 15 | 22 | 132 mm - passed |
| 28 | Cl | $CH_2Cl$ | 10 | 47 | 102 mm - passed |
| 29 | $HOCH_2$ | $CH_3$ | 15 | 28 | 168 mm - failed |

What is claimed is:

1. A polyacrylimide or polymethacrylimide resin foam comprising (A) a polymer having 70 to 100 percent by weight of repeating units of the formula

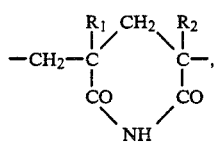

wherein $R_1$ and $R_2$ are each hydrogen or methyl and 0–30 percent by weight of units of at least one other ethylenically unsaturated comonomer, and (B) at least 1 percent of phosphorus, by weight of the polymer, present at least partially in the form of an organophosphorus compound of the formula

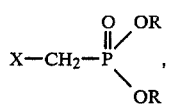

wherein R are the same or different and are methyl, ethyl, or chloromethyl and X is hydrogen, halogen, hydroxyl, or RO—CO—.

2. A polyacrylimide or polymethacrylimide resin foam as in claim 1 wherein said polymer is a copolymer comprising a metal acrylate or metal methacrylate monomer.

3. A polyacrylimide or polymethacrylimide resin foam as in claim 2 wherein said metal is an alkali metal, an alkaline earth metal, zinc, lead, or zirconium.

4. A polyacrylimide or polymethacrylimide resin foam as in claim 3 wherein said metal is sodium, potassium, magnesium, or calcium.

5. A polyacrylimide or polymethacrylimide resin foam as in claim 1 wherein said polymer is a copolymer comprising maleic acid, itaconic acid, or the anhydrides of these acids.

6. A polyacrylimide or polymethacrylimide resin foam as in claim 1 wherein said organophosphorus compound is free of halogen.

7. A polyacrylimide or polymethacrylimide resin foam as in claim 1 wherein X is $CH_3O$—CO—, $C_2H_5O$—CO—, or hydrogen.

8. A method for making a polyacrylimide or polymethacrylimide resin foam as in claim 1 which comprises free radically polymerizing a monomer mixture comprising at least 20 percent by weight of acrylic and/or methacrylic acid, at least one other ethylenically unsaturated comonomer, a blowing agent soluble in the monomer mixture and which liberates gas at a temperature from 150° C. to 250° C. by decomposition or vaporization, and at least 1 percent by weight of phosphorus, present at least partially in the form of a dissolved organophosphorus compound, and then heating the foamable polymer so formed to a temperature from 150° C. to 250° C. until a foamed resin is formed, said comonomer and blowing agents being such that on heating of the foamable polymer, repeating units of the formula

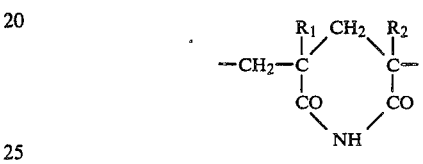

are formed in an amount of at least 70 percent by weight of the polymer, said organophosphorus compound having the structure

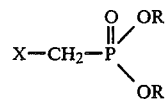

9. A method as in claim 8 wherein said polymerization is carried out in a mold having glass or metal walls.

10. A method as in claim 9 wherein said mold is immersed in a water bath during the polymerization.

11. A method as in claim 8 wherein said blowing agent is urea or formamide.

* * * * *